(12) United States Patent
Wen et al.

(10) Patent No.: US 11,225,781 B2
(45) Date of Patent: Jan. 18, 2022

(54) FLUID DIVERTING DEVICE

(71) Applicant: Yu-Hua Wen, Keelung (TW)

(72) Inventors: Yu-Hua Wen, Keelung (TW); Chien-Hung Wu, Keelung (TW); Wen-Yu Wu, Keelung (TW); Tai-Jen Wu, Keelung (TW)

(73) Assignee: Yu-Hua Wen, Keelung (TW)

( * ) Notice: Subject to any disclaimer, the term of this patent is extended or adjusted under 35 U.S.C. 154(b) by 139 days.

(21) Appl. No.: 16/664,822

(22) Filed: Oct. 26, 2019

(65) Prior Publication Data

US 2020/0263397 A1 Aug. 20, 2020

(30) Foreign Application Priority Data

Feb. 19, 2019 (TW) .................................. 108105433

(51) Int. Cl.
| | |
|---|---|
| *F16L 41/12* | (2006.01) |
| *E03B 7/09* | (2006.01) |
| *F16L 41/02* | (2006.01) |
| *E03B 7/07* | (2006.01) |
| *E03B 7/04* | (2006.01) |
| *F16L 41/16* | (2006.01) |

(52) U.S. Cl.
CPC .................. *E03B 7/09* (2013.01); *E03B 7/04* (2013.01); *E03B 7/075* (2013.01); *F16L 41/021* (2013.01); *F16L 41/12* (2013.01); *F16L 41/16* (2013.01); *Y10T 137/613* (2015.04); *Y10T 137/614* (2015.04)

(58) Field of Classification Search
CPC ....... F16L 41/12; F16L 41/16; Y10T 137/613; Y10T 137/614
See application file for complete search history.

(56) References Cited

U.S. PATENT DOCUMENTS

| | | | | |
|---|---|---|---|---|
| 45,964 A | * | 1/1865 | Ball ........................ | F16L 41/16 285/197 |
| 2,705,158 A | * | 3/1955 | Risley .................... | F16L 25/028 285/47 |

(Continued)

*Primary Examiner* — Kevin F Murphy
(74) *Attorney, Agent, or Firm* — Maschoff Brennan

(57) ABSTRACT

Disclosed is a fluid diverting device which comprises a saddle unit, a water dividing unit and a leakproof tube unit. The saddle unit includes a saddle body, a water inlet through hole and a main pipe accommodating portion. The water dividing unit includes a water dividing main portion, an inlet tube portion and an outlet tube portion. The inlet tube portion is inserted into the water inlet through hole. A screw thread is provided on an external tube wall of the inlet tube portion or on an internal tube wall of the inlet tube portion. The leakproof tube unit includes a sleeve portion, a connecting portion and a leakproof pad. The connecting portion is provided on one end of the sleeve portion and the leakproof pad is in tight contact with the connecting portion. A corresponding screw thread is provided on an external tube wall of the sleeve portion or on an internal tube wall of the sleeve portion. The sleeve portion is screwed with the inlet tube portion in a manner that the external tube wall of the sleeve portion is screwed with the internal tube wall of the inlet tube portion or the internal tube wall of the sleeve portion is screwed with the external tube wall of the inlet tube portion.

7 Claims, 4 Drawing Sheets

(56) References Cited

U.S. PATENT DOCUMENTS

| | | | | |
|---|---|---|---|---|
| 3,489,441 A | * | 1/1970 | Malcolm | F16L 41/12 285/197 |
| 3,844,590 A | * | 10/1974 | de la Fuente Burton | F16L 47/30 285/197 |
| 4,078,833 A | * | 3/1978 | Carter | F16L 41/12 285/199 |
| 6,158,474 A | * | 12/2000 | Ishikawa | F16L 41/12 138/109 |
| 2016/0040816 A1 | * | 2/2016 | Cheng-Sheng | F16L 41/021 285/130.1 |

* cited by examiner

FLUID DIVERTING DEVICE

FIELD OF THE INVENTION

The present invention relates to a corporation stop, and more particularly relates to a fluid diverting device.

BACKGROUND OF THE INVENTION

A corporation stop is a kind of water dividing unit, which is usually installed in a branch position between the main water pipe and the branch water pipe to allow tap water, supplied by a tap water corporation, to distribute to an end-user. One end of the corporation stop is connected to the water supplying pipe, and the other end of the corporation stop is connected to the water pipe of the end-user such that the tap water can be diverted to end-users.

The corporation stop is usually mounted on a saddle to attach to the water pipe. However, because a conventional corporation stop is with its mounting structure poor to be fixed between the corporation stop and the saddle, it causes drawbacks such as sewage and impurities permeating from the environment through the poor mounting structure between the conventional corporation stop and the saddle. It thus pollutes the tap water. Therefore, an improvement to the conventional corporation stop is required.

SUMMARY OF THE INVENTION

In view of the above, an objective of the present invention is to provide a fluid diverting device for effectively preventing sewage or impurities from leaking into the water pipe.

In order to solve the abovementioned problem, the present invention provides a fluid diverting device that diverts water from a water pipe, the fluid diverting device comprising: a saddle unit including a saddle body, a water inlet through hole and a main pipe accommodating portion, the saddle body having an upper saddle element and a lower saddle element, the water inlet through hole being formed on an upper side of the upper saddle element, the main pipe accommodating portion being formed as enclosed by the upper saddle element and the lower saddle element, the saddle body surrounding the water pipe such that the water pipe passes through the main pipe accommodating portion; a water dividing unit including a water dividing main portion, an inlet tube portion and an outlet tube portion, the inlet tube portion and the outlet tube portion respectively extending from the water dividing main portion, the inlet tube portion being inserted into the water inlet through hole, a screw thread being provided on an external tube wall surface of the inlet tube portion or an internal tube wall surface of the inlet tube portion; and a leakproof tube unit including a sleeve portion, a connecting portion and a leakproof pad, the connecting portion being provided on one end of the sleeve portion, the leakproof pad being in tight contact with the connecting portion, an inner tube space of the sleeve portion, an inner tube space of the connecting portion and an inner tube space of the leakproof pad being in fluid-connection with each other to form a fluid passage, a corresponding screw thread being provided on an external tube wall surface of the sleeve portion or being provided on an internal tube wall surface of the sleeve portion, the sleeve portion being provided to screw with the inlet tube portion to form a screw-connection portion in such a manner that the external tube wall surface of the sleeve portion is screwed with the internal tube wall surface of the inlet tube portion or the internal tube wall surface of the sleeve portion is screwed with the external tube wall surface of the inlet tube portion such that the screwed together sleeve portion and the inlet tube portion are inserted into the water inlet through hole, the leakproof pad being attached on the water pipe and in fluid-connection with the water pipe so as to enable the water in the water pipe to flow from the leakproof pad to the outlet tube portion through the connecting portion, the screw-connection portion and the water dividing main portion.

In one embodiment of the present invention, the fluid diverting device is provided, wherein the external tube wall surface of the sleeve portion is screwed with the internal tube wall surface of the inlet tube portion, a plurality of positioning portions are provided on the external tube wall surface of the inlet tube portion, a plurality of corresponding positioning portions are provided on a wall of the water inlet through hole, and each of the positioning portions is engaged with each of corresponding positioning portions such that the inlet tube portion is mounted on the water inlet through hole.

In one embodiment of the present invention, the fluid diverting device is provided, wherein the internal tube wall surface of the sleeve portion is screwed with the external tube wall surface of the inlet tube portion, a plurality of positioning portions are provided on the external tube wall surface of the inlet tube portion, a plurality of corresponding positioning portions are provided on a wall of the water inlet through hole, and each of the positioning portions is engaged with each of the corresponding positioning portions such that the inlet tube portion is mounted on the water inlet through hole.

In one embodiment of the present invention, the fluid diverting device is provided, wherein the external tube wall surface of the sleeve portion is screwed with the internal tube wall surface of the inlet tube portion, the fluid diverting device further comprises a leakproof ring, the leakproof ring fits around the external tube wall surface of the sleeve portion, and the leakproof ring abuts against the inlet tube portion and a lower end of the water inlet through hole so as to prevent from leakage caused by a gap between the external tube wall surface of the inlet tube portion and the wall of the water inlet through hole.

In one embodiment of the present invention, the fluid diverting device is provided, wherein the internal tube wall surface of the sleeve portion is screwed with the external tube wall surface of the inlet tube portion, the fluid diverting device further comprises a leakproof ring, the leakproof ring fits around the external tube wall surface of the inlet tube portion, and the leakproof ring abuts against the inlet tube portion and an upper end of the water inlet through hole so as to prevent from leakage caused by a gap between the external tube wall surface of the inlet tube portion and the wall of the water inlet through hole.

In one embodiment of the present invention, the fluid diverting device is provided, wherein a recess portion is formed on an outer peripheral surface of the connecting portion, a protruding portion is formed on an inner edge of the leakproof pad in position corresponding to the recess portion, and the leakproof pad fits around the outer peripheral surface of the connecting portion in such a manner that the protruding portion is engaged with the recess portion.

In one embodiment of the present invention, the fluid diverting device is provided, wherein the connecting portion is a flange.

In one embodiment of the present invention, the fluid diverting device is provided, wherein the leakproof tube unit is screwed with the inlet tube portion in such a manner that the external tube wall surface of the sleeve portion is screwed with the internal tube wall surface of the inlet tube portion, and the fluid diverting device further comprises a seal ring fitting around the external tube wall surface of the sleeve portion and contacting the internal tube wall surface of the inlet tube portion.

In one embodiment of the present invention, the fluid diverting device is provided, wherein the leakproof tube unit is screwed with the inlet tube portion in such a manner that the internal tube wall surface of the sleeve portion is screwed with the external tube wall surface of the inlet tube portion, and the fluid diverting device further comprises a seal ring fitting around a lower end of the inlet tube portion and contacting the internal tube wall surface of the sleeve portion.

By the technical means adopted by the present invention, which applies the saddle unit, the water dividing unit and the leakproof tube unit, the fluid diverting device of the present invention can effectively prevent from leakage caused in position between the water dividing unit and the saddle unit. Thus the present invention could avoid from tap water pollution. Preferably, according to the screwed structure of the water dividing unit and the leakproof tube unit, the seal ring is provided on the outer tube wall of the sleeve portion or the outer tube wall of the inlet pipe portion, so as to prevent, through the mounting structure between the water dividing unit and the saddle unit or through the environment around the water pipe, from sewage or impurities permeating into the water pipe. Moreover, in contrast to the conventional saddle, which requires a threading process that forms a screw thread on the mounting structure of the conventional saddle in order to connect to the corporation stop, the saddle of the present invention does not require such screw thread on the mounting structure. Therefore, the present invention does not need the threading process and the manufacturing process of the saddle can be simplified.

DETAILED DESCRIPTION OF THE PREFERRED EMBODIMENTS

The preferred embodiments of the present invention are described in detail below with reference to FIG. 1 to FIG. 4. The description is used for explaining the embodiments of the present invention only, but not for limiting the scope of the claims.

Figure 1:
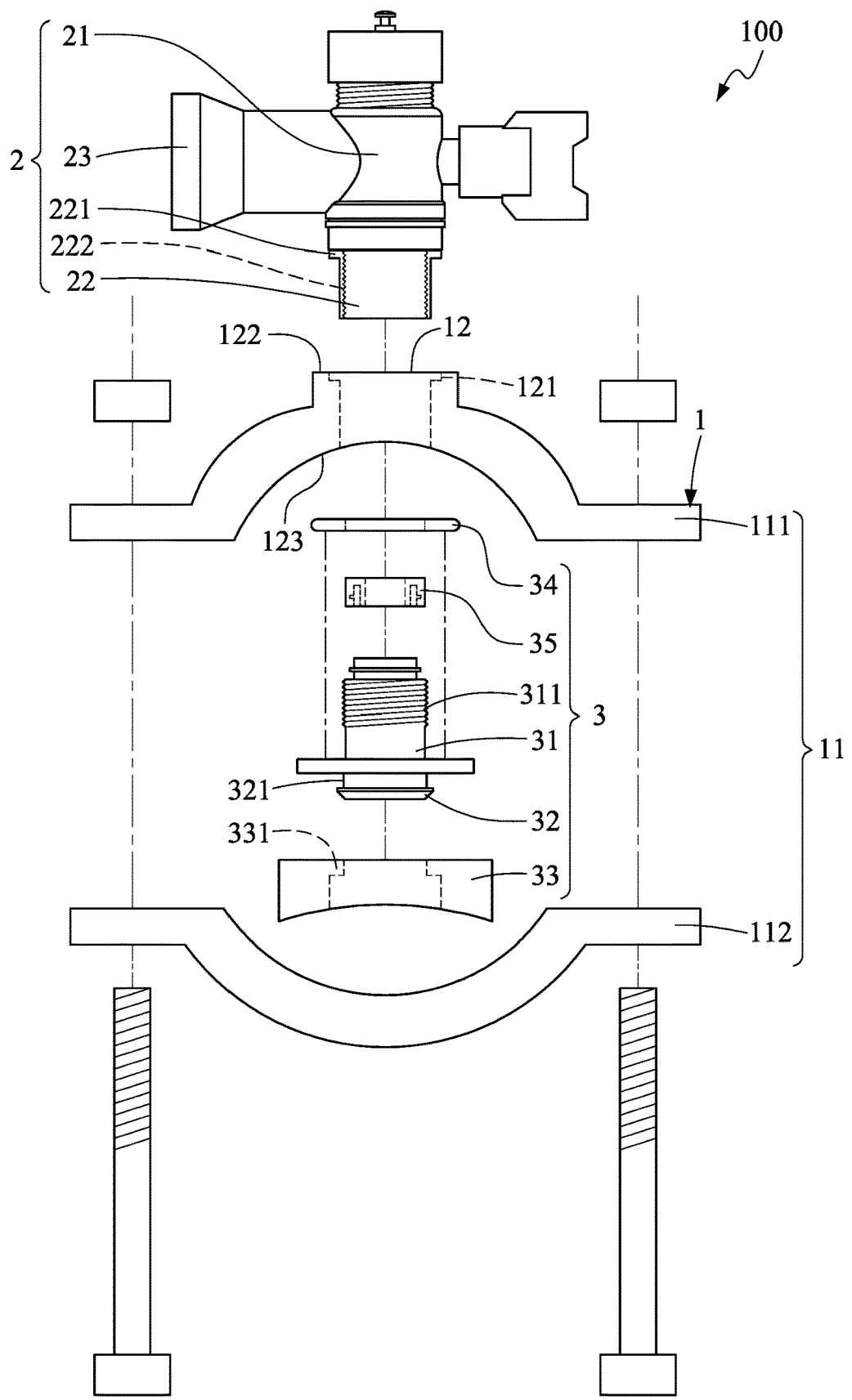
FIG. 1 is an exemplary exploded view of a fluid diverting device according to one embodiment of the present invention.
Figure 2:
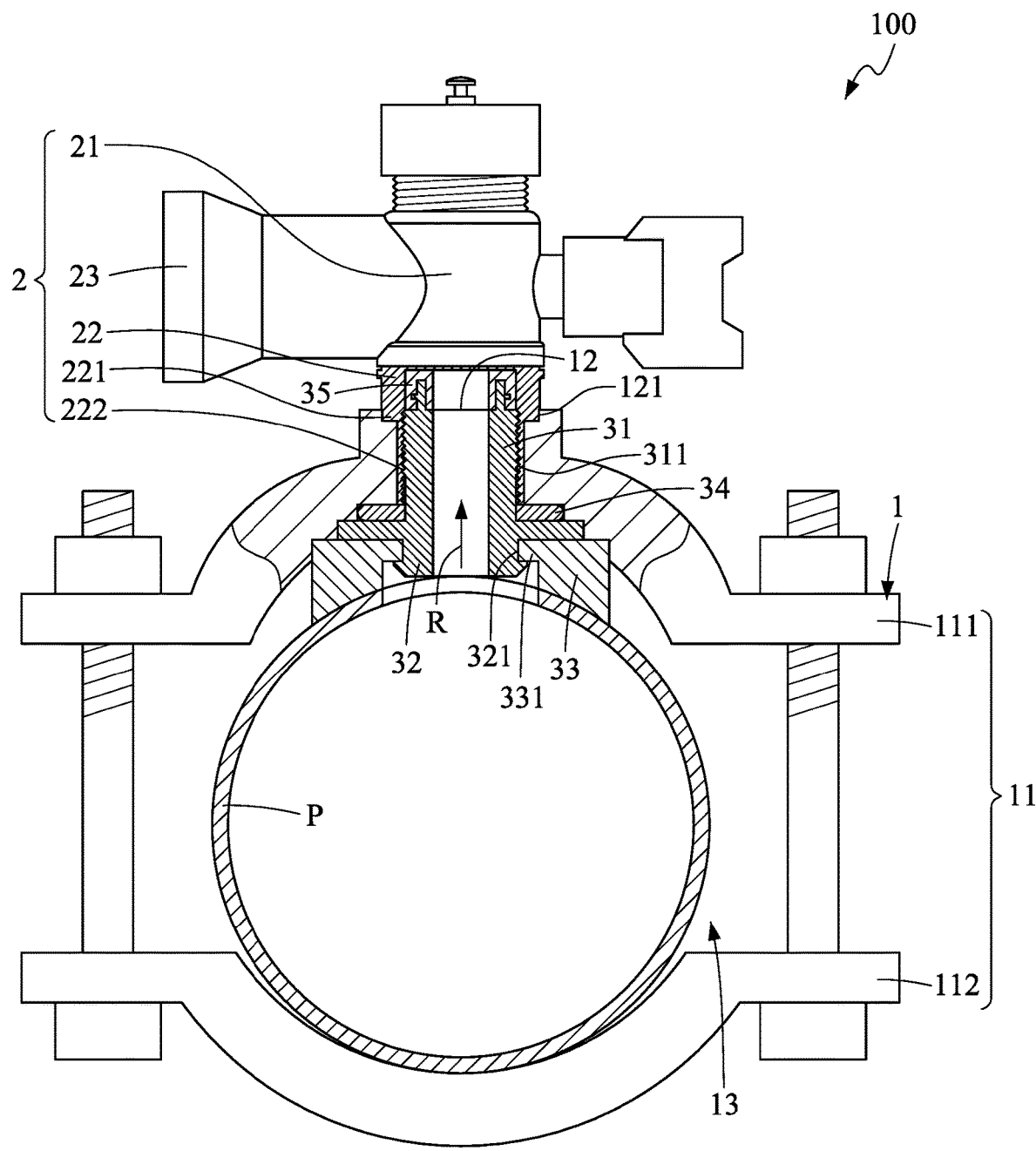
FIG. 2 is an exemplary sectional view of the fluid diverting device according to the embodiment of the present invention.

As shown in FIG. 1 and FIG. 2, according to one embodiment of the present invention, a fluid diverting device 100 is used for diverting the water from a water pipe P. The fluid diverting device 100 comprises a saddle unit 1, a water dividing unit 2 and a leakproof tube unit 3.

As shown in FIG. 1 and FIG. 2, the saddle unit 1 includes a saddle body 11, a water inlet through hole 12 and a main pipe accommodating portion 13. The saddle body 11 includes an upper saddle element 111 and a lower saddle element 112. The water inlet through hole 12 is formed on an upper side of the upper saddle element 111. The main pipe accommodating portion 13 is formed as enclosed by the upper saddle element 111 and the lower saddle element 112. The saddle body 11 surrounds the water pipe P such that the water pipe P passes through the main pipe accommodating portion 13. Specifically, in the embodiment, the water pipe P is fixed at the main pipe accommodating portion 13 in such a manner that the respective ends of the upper saddle element 111 and the respective ends of the lower saddle element 112 are secured together by a screw.

As shown in FIG. 1 and FIG. 2, the water dividing unit 2 includes a water dividing main portion 21, an inlet tube portion 22 and an outlet tube portion 23. The inlet tube portion 22 and the outlet tube portion 23 respectively extend from the water dividing main portion 21. Specifically, the inlet tube portion 22 extends downward from the water dividing main portion 21 and the outlet tube portion 23 extends forward from the water dividing main portion 21. The inlet tube portion 22 is inserted into the water inlet through hole 12.

As shown in FIG. 1 and FIG. 2, a plurality of positioning portions 221 are provided on the external tube wall surface of the inlet tube portion 22, wherein each of the positioning portions 221 is a protrusion. A plurality of corresponding positioning portions 121 are provided on a wall of the water inlet through hole 12, wherein each of the corresponding positioning portions is a recess. Two positioning portions 221 and two corresponding positioning portions 121 are provided in the embodiment. Each of the positioning portions 221 is engaged with each of the corresponding positioning portions 121 such that the inlet tube portion 22 is installed in the water inlet through hole 12. A screw thread 222 is provided on the internal tube wall surface of the inlet tube portion 22 for screwing with the leakproof tube unit 3.

As shown in FIG. 1 and FIG. 2, the leakproof tube unit 3 includes a sleeve portion 31, a connecting portion 32 and a leakproof pad 33. The connecting portion 32 is provided on one end of the sleeve portion 31 and the leakproof pad 33 is in tight contact with the connecting portion 32. An inner tube space of the sleeve portion 31, an inner tube space of the connecting portion 32 and an inner tube space of the leakproof pad 33 are in fluid-connection with each other to form a fluid passage R. A corresponding screw thread 311 is provided on an external tube wall surface of the sleeve portion 31. The sleeve portion 31 is provided to screw with the inlet tube portion 22 to form a screw-connection portion. Specifically, in the embodiment, the external tube wall surface of the sleeve portion 31 is screwed with the internal tube wall surface of the inlet tube portion 22 in such a manner that the corresponding screw thread 311 is screwed with the screw thread 222. An external tube wall surface of the inlet tube portion 22 contacts the wall of the water inlet through hole 12. The leakproof pad 33 is attached on the water pipe P and is in fluid-connection with the water pipe P so as to enable the water in the water pipe P to flow from the leakproof pad 33 to the outlet tube portion 23 through the connecting portion 32, the screw-connection portion and the water dividing main portion 21.

As shown in FIG. 1 and FIG. 2, the fluid diverting device 100 further includes a leakproof ring 34 and a seal ring 35. The leakproof ring 34 fits around the external tube wall surface of the sleeve portion 31 and abuts against the inlet tube portion 22 and a lower end 123 of the water inlet through hole 12 so as to prevent from leakage caused by a gap between the external tube wall surface of the inlet tube portion 22 and the wall of the water inlet through hole 12. The seal ring 35 fits around the external tube wall surface of the sleeve portion 31 and contacts the internal tube wall surface of the inlet tube portion 22 so as to prevent the tap water from leaking into the inlet tube portion 22.

As shown in FIG. 1 and FIG. 2, in the embodiment, a recess portion 321 is formed on an outer peripheral surface of the connecting portion 32, and a protruding portion 331 is formed on an inner edge of the leakproof pad 33 in position corresponding to the recess portion 321, wherein the leakproof pad 33 fits around the outer peripheral surface of the connecting portion 32 in such a manner that the protruding portion 331 is engaged with the recess portion 321. Moreover, in the embodiment, the connecting portion 32 is a flange.

Figure 3:
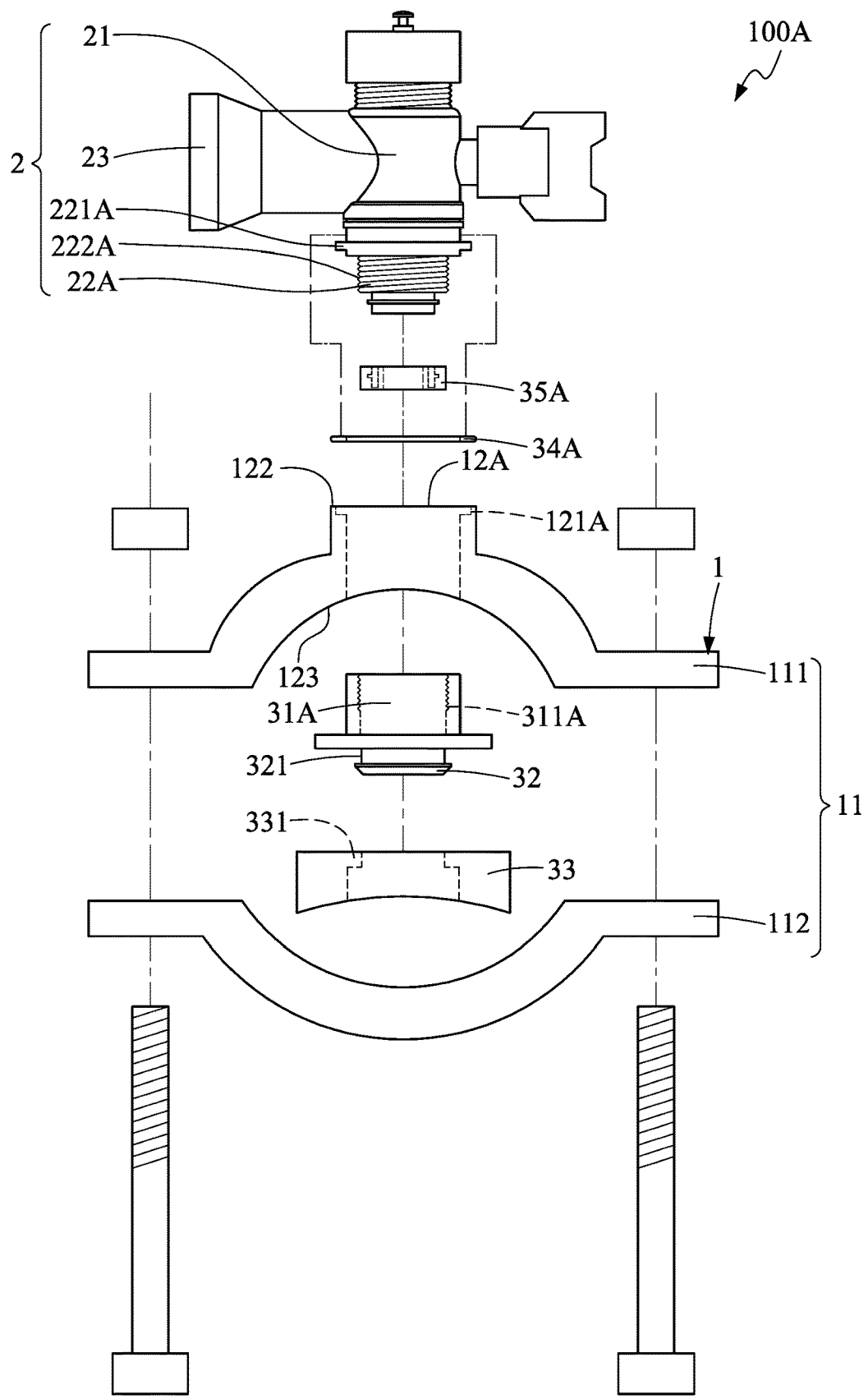
FIG. 3 is an exemplary exploded view of a fluid diverting device according to another embodiment of the present invention.
Figure 4:
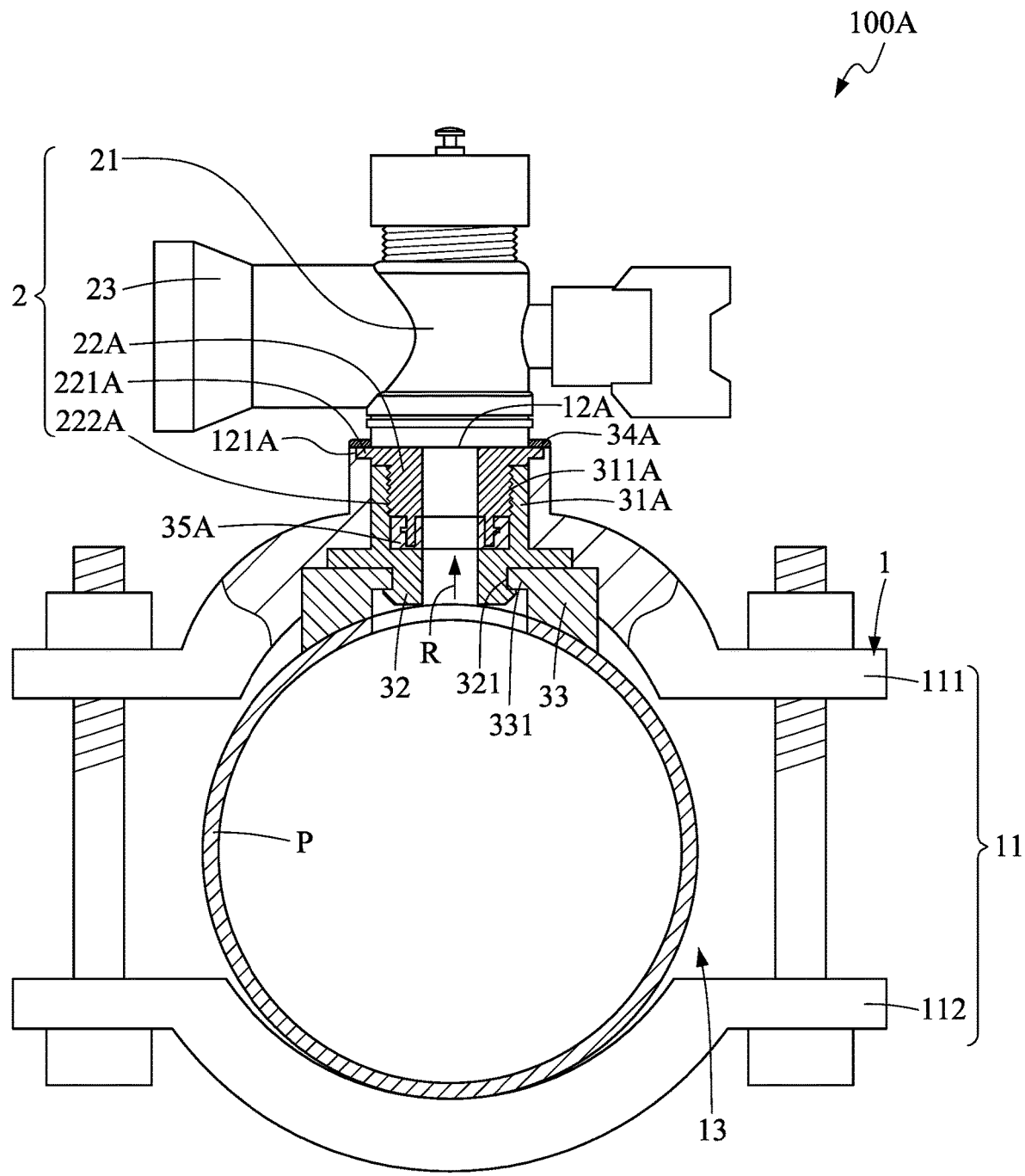
FIG. 4 is an exemplary sectional view of the fluid diverting device according to another embodiment of the present invention.

As shown in FIG. 3 and FIG. 4, according to the second embodiment of the present invention, a fluid diverting device 100A is provided. The difference between a fluid diverting device 100A according to the second embodiment of the present invention and the fluid diverting device 100 according to the first embodiment of the present invention is that a sleeve portion 31A is screwed with the inlet tube portion 22A in such a manner that the corresponding screw thread 311A on the internal tube wall surface of the sleeve portion 31A is screwed with the screw thread 222A on the external tube wall surface of the inlet tube portion 22A, and the external tube wall of the sleeve portion 31A contacts the wall of the water inlet through hole 12A. Two positioning portions 221A are provided at the connection between the water dividing main portion 21 and the inlet tube portion 22A, and two corresponding positioning portions 121A are provided on the wall of the water inlet through hole 12A. Each of two positioning portions 221A is respectively engaged with each of two corresponding positioning portions 121A such that the sleeve portion 31A is installed in the water inlet through hole 12A. In the embodiment, the positioning portion 221A is a protrusion, and the corresponding positioning portion 121A is a recess. The leakproof ring 34A fits around the external tube wall surface of the inlet tube portion 22A, and abuts against the inlet tube portion 22A and an upper end 122 of the water inlet through hole 12A so as to prevent from leakage caused by a gap between the external tube wall surface of the inlet tube portion 22A and the wall of the water inlet through hole 12A. A seal ring 35A fits around a lower end 123 of the inlet tube portion 22A and contacts the internal tube wall surface of the sleeve portion 31A so as to prevent water leakage in the sleeve portion 31A.

With the abovementioned structure, the fluid diverting device 100, 100A is mounted on the water pipe P by the combinational use of the saddle unit 1, the water dividing unit 2 and the leakproof tube unit 3, thereby effectively preventing from leakage caused by a gap between the water dividing unit 2 and the saddle unit 1. In the first embodiment, the leakproof ring 34 is provided on the external tube wall of the sleeve portion 31 so as to prevent sewage or impurities from leaking into the water pipe P through the gap between the external tube wall of the inlet tube portion 22 and the wall of the water inlet through hole 12. In the second embodiment, the leakproof ring 34A is provided on the external tube wall of the inlet tube portion 22A so as to prevent sewage or impurities from leaking into the water pipe P from the environment around the water pipe P through the gap between the external tube wall of the sleeve portion 31A and the wall of the water inlet through hole 12. Furthermore, in the prior art, a screw thread and a corresponding screw thread, which are capable of being screwed with each other, are respectively formed on an external surface of a connection portion of a corporation stop and an internal surface of a mounting hole of a saddle by a threading process. And, the corporation stop is screwed to be mounted to the saddle while the internal surface of the mounting hole of the saddle on which the screw thread is formed is coated with a waterproof glue. However, the screw thread of the mounting hole is easily oxidized to form rust after long-term usage, and the rust and the waterproof glue may intrude into the water pipe, thereby polluting the tap water. On the contrary, in the present invention, the saddle unit 1 requires no screw thread and no waterproof glue thereon, and the threading process and a coating process of the waterproof glue are not required during the manufacturing process of the saddle unit 1 so as to simplify the manufacturing process of the saddle unit 1 and avoid the water pollution caused by intrusion of rust and the waterproof glue.

The above description should be considered only as an explanation of the preferred embodiment of the present invention. A person with ordinary skill in the art can make various modifications to the present invention based on the scope of the claims and the above description. However, those modifications shall fall within the scope of the present invention.

What is claimed is:

1. A fluid diverting device that diverts water from a water pipe, the fluid diverting device comprising:

a saddle unit including a saddle body, a water inlet through hole and a main pipe accommodating portion, the saddle body having an upper saddle element and a lower saddle element, the water inlet through hole being formed on an upper side of the upper saddle element, the main pipe accommodating portion being formed as enclosed by the upper saddle element and the lower saddle element, the saddle body surrounding the water pipe such that the water pipe passes through the main pipe accommodating portion;

a water dividing unit including a water dividing main portion, an inlet tube portion and an outlet tube portion, the inlet tube portion and the outlet tube portion respectively extending from the water dividing main portion, the inlet tube portion being inserted into the water inlet through hole, a screw thread being provided on an external tube wall surface of the inlet tube portion or an internal tube wall surface of the inlet tube portion; and a leakproof tube unit including a sleeve portion, a connecting portion and a leakproof pad, the connecting portion being provided on one end of the sleeve portion, the leakproof pad being in tight contact with the connecting portion, an inner tube space of the sleeve portion, an inner tube space of the connecting portion and an inner tube space of the leakproof pad being in fluid-connection with each other to form a fluid passage, a corresponding screw thread being provided on an external tube wall surface of the sleeve portion or being provided on an internal tube wall surface of the sleeve portion, the sleeve portion being provided to screw with the inlet tube portion to form a screw-connection portion in such a manner that the external tube wall surface of the sleeve portion is screwed with the internal tube wall surface of the inlet tube portion or the internal tube wall surface of the sleeve portion is screwed with the external tube wall surface of the inlet tube portion such that the screwed together sleeve portion and the inlet tube portion are inserted into the water inlet through hole, the leakproof pad being attached on the water pipe and in fluid-connection with the water pipe so as to enable the water in the water pipe to flow from the leakproof pad to the outlet tube portion through the connecting portion, the screw-connection portion and the water dividing main portion, wherein a plurality of positioning portions are provided on the external tube wall surface of the inlet tube portion, a plurality of corresponding positioning portions are provided on a wall of the water inlet through hole, and each of the positioning portions is engaged with each of corresponding positioning portions such that the inlet tube portion is mounted on the water inlet through hole.

2. The fluid diverting device according to claim 1, wherein the external tube wall surface of the sleeve portion is screwed with the internal tube wall surface of the inlet tube portion, the fluid diverting device further comprises a leakproof ring, the leakproof ring fits around the external tube wall surface of the sleeve portion, and the leakproof ring abuts against the inlet tube portion and a lower end of the water inlet through hole so as to prevent from leakage caused by a gap between the external tube wall surface of the inlet tube portion and the wall of the water inlet through hole.

3. The fluid diverting device according to claim 1, wherein the internal tube wall surface of the sleeve portion is screwed with the external tube wall surface of the inlet tube portion, the fluid diverting device further comprises a leakproof ring, the leakproof ring fits around the external tube wall surface of the inlet tube portion, and the leakproof ring abuts against the inlet tube portion and an upper end of the water inlet through hole so as to prevent from leakage caused by a gap between the external tube wall surface of the inlet tube portion and the wall of the water inlet through hole.

4. The fluid diverting device according to claim 1, wherein a recess portion is formed on an outer peripheral surface of the connecting portion, a protruding portion is formed on an inner edge of the leakproof pad in position corresponding to the recess portion, and the leakproof pad fits around the outer peripheral surface of the connecting portion in such a manner that the protruding portion is engaged with the recess portion.

5. The fluid diverting device according to claim 1, wherein the connecting portion is a flange.

6. The fluid diverting device according to claim 1, wherein the leakproof tube unit is screwed with the inlet tube portion in such a manner that the external tube wall surface of the sleeve portion is screwed with the internal tube wall surface of the inlet tube portion, and the fluid diverting device further comprises a seal ring fitting around the external tube wall surface of the sleeve portion and contacting the internal tube wall surface of the inlet tube portion.

7. The fluid diverting device according to claim 1, wherein the leakproof tube unit is screwed with the inlet tube portion in such a manner that the internal tube wall surface of the sleeve portion is screwed with the external tube wall surface of the inlet tube portion, and the fluid diverting device further comprises a seal ring fitting around a lower end of the inlet tube portion and contacting the internal tube wall surface of the sleeve portion.

* * * * *